United States Patent

[11] 3,581,643

[72] Inventor Hirofumi Yoshimura
    Okaya-shi, Japan
[21] Appl. No. 725,111
[22] Filed Apr. 29, 1968
[45] Patented June 1, 1971
[73] Assignee Kabushiki Kaisha Yashica
    Tokyo-to, Japan
[32] Priority May 2, 1967
[33] Japan
[31] 42/36,363

[54] LIGHT MEASURING DEVICE
    10 Claims, 2 Drawing Figs.
[52] U.S. Cl. .................................. 95/42,
    95/10, 356/226
[51] Int. Cl. .................................. G03b 19/12,
    G01j 1/00
[50] Field of Search ........................... 95/42, 10
    C, 64 D; 356/225, 226, 227

[56] References Cited
    UNITED STATES PATENTS
3,397,629 8/1968 Mori et al. ................. 95/10
3,460,450 8/1969 Ogihara ..................... 95/53(X)
3,436,158 4/1969 Schmitt ..................... 356/225X
3,452,656 7/1969 Ruhle et al. ................ 95/10
    FOREIGN PATENTS
1,466,805 1/1967 France ...................... 95/10
    OTHER REFERENCES
Funxchau, 1964/Heft 19, pg. 519

Primary Examiner—John M. Horan
Assistant Examiner—Richard L. Moses
Attorney—Stanley Wolder ABSTRACT: A light measuring device includes a photoconductor and variable resistor series connected to a battery. The voltage across the variable resistor is applied to the input of a pair of amplifiers each of which includes an input switching transistor having emitter and collector resistors, and an output transistor with an output energizing a signal lamp. Another transistor has its input connected between the switching transistor collectors and its output to a third lamp. The ratio of the resistances of the collector and emitter resistors are different so that the switching transistor stages respond to different level signals and the output transistors are of opposite types.

INVENTOR
HIROFUMI YOSHIMURA
BY Stanley Wolder
ATTORNEY 3,581,643

LIGHT MEASURING DEVICE

BACKGROUND OF THE INVENTION

The present invention relates generally to an improved light measuring device and it relates particularly to an improved exposure meter for determining the required camera photographic parameters as related to the ambient light conditions.

The conventional exposure meter, whether independent of, or mechanically or visually coupled or associated with the camera exposure adjusting mechanisms possesses many disadvantages. These exposure meters respond to the incident light intensity as effected by electrical and optical adjustments and employs a sensitive microammeter to provide a visual indication of the light measurement. As a consequence, the exposure meter is subject to the many drawbacks which accompany the use of a microammeter. An accurate microammeter is an expensive and fragile device which is highly sensitive to shock which easily damages the instrument to render it unresponsive or inaccurate. Moreover, these instruments are of poor durability and the servicing and adjustment thereof are very difficult and highly impractical. The conventional exposure meter, possessing the numerous disadvantages of the sensitive current meter, thus leaves much to be desired.

SUMMARY OF THE INVENTION

A principal object of the present invention is to provide an improved light measuring device.

Another object of the present invention is to provide an improved exposure meter for photographic cameras.

Still another object of the present invention is to provide an improved electrical exposure meter.

A further object of the present invention is to provide an improved electrical exposure meter in which the need for a microammeter is obviated.

Still a further object of the present invention is to provide an improved electrical exposure meter having no microammeter mechanism, which is adjustable to the various photography parameters including incident light, shutter speed, diaphragm opening and film speed and provides an indication as to proper, excess or insufficient light conditions.

Another object of the present invention is to provide an exposure meter of the above nature characterized by its reliability, accuracy, ruggedness, versatility and adaptability, and low cost.

The above and other objects of the present invention will become apparent from a reading of the following description taken in conjunction with the accompanying drawing which illustrates a preferred embodiment thereof.

In a sense the present invention contemplates the provision of a light measuring device comprising a photoresponsive element, control means including first and second amplifiers differently responsive to said photoresponsive element and first and second electric lamps energized in response to the outputs of said first and second amplifiers respectively. A third amplifier is advantageously provided which is controlled by the difference in the outputs of the first two amplifiers and controls the energization of a third lamp. The values of the components of the device are such that at a predetermined signal as derived from the photosensitive element and applied to the first and second amplifiers there is a difference in the states of these amplifiers so that the third lamp is energized and an increase or drop in the signal is accompanied by the first two amplifiers becoming substantially highly conducting or cutoff.

In accordance with a preferred embodiment of the present invention a photoconductor is connected in series with a variable resistor across a source of current. A pair of similar switching amplified transistors are connected across the current source through corresponding emitter and collector resistors, the variable resistor being connected between the respective transistor bases and the emitter resistors and may be considered an input common to the two transistor amplifiers. The ratio of the resistance of the collector resistor to that of the emitter resistor of each transistor is different from that of the other transistor so that the transistors switch between conducting and nonconducting states at different signal levels. The output of the switching transistors control respective output transistors of opposite types which in turn control the energization of corresponding lamps. A third output transistor has its input connected between the switching transistor collectors and its output controls the energization of a third lamp. The three lamps are provided with different colored light filters and are viewable through the camera viewer eyepiece.

The present exposure meter obviates the need for any microammeter and avoids all the drawbacks thereof and provides a visual indication of whether the light level is high, low or correct.

DESCRIPTION OF THE PREFERRED EMBODIMENT

Figure 1:
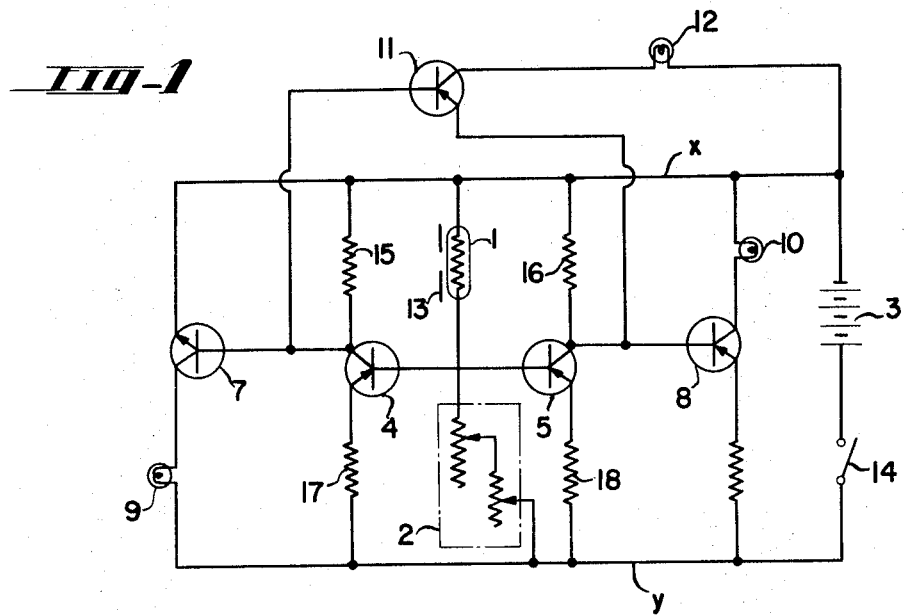
FIG. 1 is a schematic diagram of light measuring network embodying the present invention.
Figure 2:
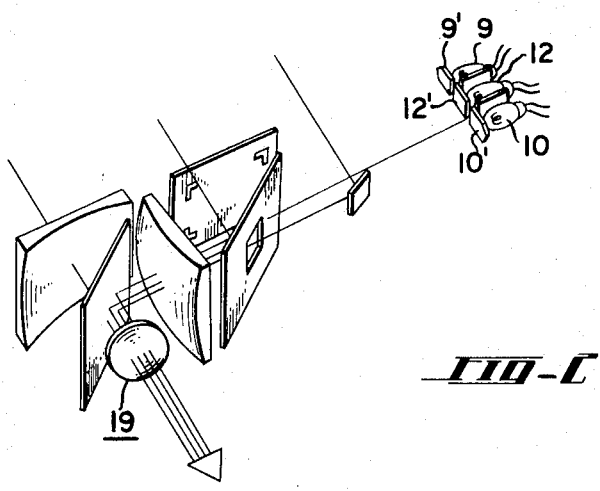
FIG. 2 is a perspective view of the indicating lamp viewing assembly associated therewith.

Referring now to the drawing which illustrates a preferred embodiment of the present invention, the reference numeral 3 generally designates a battery for energizing the device, the negative terminal of the battery being connected to a line $X$ and the positive terminal being connected through a switch 14 to a line $y$. A photosensitive element, for example a photoconductor 1, such as a cadmium sulfide cell, is connected in series with a variable resistor assembly 2 between the lines $x$ and $y$. Although the variable resistor assembly is illustrated as a pair of series connected variable resistors a single variable resistor or other variable resistor arrangements may be employed. The resistor assembly 2 may be adjusted in accordance with one or more of the photographing parameters, except light intensity, for example, shutter speed, diaphragm opening and film speed. An adjustable light attenuater or diaphragm 13 may be, if desired, positioned between the photoconductor 1 and the incident light to provide another mechanism for adjusting the exposure meter to the photographing parameters as aforesaid.

A pair of similar switching amplifier input transistors 4 and 5 respectively are provided, illustrated as of the PNP type, the bases of the transistors 4 and 5 being connected to the junction of the photoconductor 1 and the variable resistor 2. The collector of transistor 4 is connected to line $x$ by a collector resistor 15 of a resistance $r_{15}$ and the emitter thereof is connected to line $y$ by an emitter resistor 17 of resistance $r_{17}$. The collector of transistor 5 is connected to line $x$ by a collector resistor 16 of a resistance $r_{16}$ and the emitter thereof is connected to line $y$ by an emitter resistor 18 of resistance $r_{18}$.

The values of the biasing means defining resistors 15, 16, 17 and 18 are such that the switching or response signals or voltages of the transistor amplifiers 4 and 5 are different by a predetermined increment, so that when the relative control voltage as derived from the junction of photoconductor 1 and variable resistor 2 and applied to the bases of transistors 4 and 5 is between said switching voltages, one transistor will be conducting and the other nonconducting, and when the controlled voltage is higher than the higher switching voltage both transistors 4 and 5 will conduct and when lower than the lower switching voltage both transistors 4 and 5 will be nonconducting. In the illustrated embodiment the different transistor switching voltages or points are achieved by making $r_{15}/r_{17} \neq r_{16}/r$, for example in the specific arrangement shown $r_{15}/r_{17}$, $r_{16}/r_{18}$, which may be effected, for example, by having $r_{15}$ and $r_{16}$ equal and $r_{18}$ less than $r_{17}$. Under the above conditions, when the control voltage is between the switching voltages transistor 5 is conducting and transistor 4 is nonconducting.

The collector of transistor 4 is connected to the base of a transistor 7 and the collector of transistor 5 is connected to the base of a transistor 8 the coupled transistors 4 and 7 defining a first amplifier and the coupled transistors 5 and 8 defining a second amplifier. The transistors 7 and 8 are of opposite types, in the illustrated network the transistor 7 is of the NPN type and the transistor 8 is of the PNP type, so that the above defined first and second amplifiers are oppositely responsive to the resistance of photoconductor 1. The emitter of transistor 7 is connected to line x and the collector thereof is connected through a first electric lamp 9 to line y. The emitter of transistor 8 is connected through a resistor to line y and the collector thereof is connected through a second electric lamp 10 to line x.

A transistor 11 which defines a third amplifier has a base connected to the collector of transistor 4, an emitter connected to the collector of transistor 5, and a collector connected through a third electric lamp 12 to line x.

The lamps 9, 12 and 10 are positioned adjacent to each other in the camera so as to be concurrently viewed through the eyepiece 19 of the camera viewing and range finding system by way of the conventional semitransparent mirror employed therewith. The lamps 9, 12 and 10 are separated by opaque partitions, and differently colored light filters 9', 12' and 10' are positioned in front of the lamps 9, 12 and 10 respectively so that they are viewed through the corresponding filters.

Considering now the operation of the device described above, the switch 14 is closed and the diaphragm 13 and variable resistor 2 adjusted in accordance with the film speed rating and the selected exposure conditions such as the camera diaphragm setting and the shutter speed. It should be noted that the diaphragm 13 or variable resistor 2, may be mechanically coupled to a camera exposure adjusting mechanism such as the camera diaphragm or shutter speed control so as to be concurrently adjustable therewith. The camera is directed to the object or scene to be photographed so that the photoconductor 1 is exposed to the camera incident light.

If the value of the incident light is lower than optimum the resistance of photoconductor is relatively high so that the signal applied to the bases of transistors 4 and 5 as derived from the voltage divider including photoconductor 1 and variable resistor 2 is insufficient to drive either of the transistors 4 or 5 to their saturation or conducting state and they are thus substantially at cutoff. As a consequence, high negative signals are applied to the bases of transistors 7 and 8 so that they are nonconducting and conducting respectively and the lamp 9 is deenergized and the lamp 10 is energized and lit to provide a visual indication of insufficient light. Moreover, since the transistors 4 and 5 are at cutoff the base and emitter of transistor 11 are at substantially the same potential and the transistor 11 is substantially nonconducting whereby the lamp 12 is unenergized.

Under proper lighting conditions the light incident in the photoconductor 1 is such that the resistance of photoconductor 1 is of a value that the signal applied to the bases of the transistors 4 and 5 is between the switching signals thereof so that the transistor 5 is rendered conductive by reason of the lower resistance of resistor 18, for the reasons described above, and the transistor 4 remains nonconducting. The signal to transistor 8 is thus at cutoff and the lamp 10 deenergized, and the transistor 7 remains nonconducting and lamp 9 unenergized. However, by reason of the different states of transistors 4 and 5 the control signal applied to transistor 11 renders it conducting to energize and light lamp 12 to provide a visual indication of proper light conditions.

In the event that the incident light is excessive, the relative resistance of photoconductor 1 is low so that a high negative or switching signal is applied to the bases of transistors 4 and 5 rendering them both conducting. As a result, relatively high positive signals are applied to the bases of transistors 7 and 8, rendering transistor 7 conducting and energizing and lighting lamp 9 and rendering transistor 8 nonconducting and deenergizing lamp 10 to provide a visual indicator of excessive light. Furthermore, the signal applied to the transistor 11 as derived from the collectors of transistors 4 and 5 which are in the same conducting state is insufficient to render the transistor 11 conducting and the lamp 12 is thus unenergized.

Thus, the observer is provided with a positive visual indication of the light conditions as related to the camera photographing parameters by the lighting of one of the lamps 9, 10 or 12, only one of which is energized at any one time. If lamp 10 is lit the light is insufficient, if lamp 9 is lit, the light is excessive, and if lamp 12 is lit the light is proper. Being provided with the above information, the camera parameters, for example, the diaphragm opening or shutter speed, may be adjusted with corresponding adjustment of the diaphragm 13 or variable resistor 2 or both, until the lamp 12 is lit under the incident light conditions.

While there has been described and illustrated a preferred embodiment of the present invention, it is apparent that numerous alterations, omissions and additions may be made without departing from the spirit thereof. For example, while the different amplifier responses are described as being achieved by the use of different emitter resistor, collector resistor resistance ratios, other means and networks may be employed for this purpose.

What I claim is:

1. A light measuring device comprising a photoresponsive element, control means including first and second amplifiers oppositely responsive to said photoresponsive element and first and second means biasing said first and second amplifiers respectively to different signal response points, and first and second electric lamps concurrently coupled to and energized in response to the outputs of said first and second amplifiers respectively.

2. The light measuring device of claim 1 comprising a camera viewing system including an eyepiece, and means for concurrently observing said first and second lamps through said eyepiece.

3. The light measuring device of claim 1, wherein said photoresponsive element comprises a photoconductor and said control means includes a source of current and a variable resistor connected in series with said photoconductor to said current source, said amplifiers having a common input defined by said variable resistor.

4. The light measuring device of claim 3 wherein the outputs of said amplifiers are of opposite phase and connected to said first and second lamps respectively.

5. A light measuring device comprising a photoconductor, control means including a source of current, a variable resistor connected in series with said photoconductor to said source of current, and first and second amplifiers differently responsive to said photoconductor and each including a similar switching transistor having its collector and emitter connected to corresponding collector and emitter resistors, and its base connected through said variable resistor and a respective emitter resistor, in series, to said emitter, the ratio of the resistance of the collector resistor to that of the emitter resistor of each of said transistors being different whereby said amplifiers respond to different input signals, and first and second electric lamps energized in response to the outputs of said first and second amplifiers respectively.

6. The light measuring device of claim 5 wherein said amplifiers include opposite types output transistors each having a base connected to the output of a respective switching transistor and an output connected in series with a respective lamp to said source of current.

7. The light measuring device of claim 5 comprising a third lamp and a transistor having a base and emitter connected to respective collectors of said switching transistors, and a collector connected through said third lamp to said current source.

8. The light measuring device of claim 1 including means for adjustably attenuating the light incident on said photosensitive element.

9. The light measuring device of claim 1 including differently colored light filters positioned in front of said lamps.

10. A light measuring device comprising a photoresponsive element, control means including first and second amplifiers differently responsive to said photoresponsive element, first and second electric lamps energized in response to the outputs of said first and second amplifiers respectively, a third amplifier responsive to a difference in the states of said first and second amplifiers, and a third electric lamp energized in response to said third amplifier.